United States Patent [19]

Fromson

[11] E Re. 29,754

[45] Reissued Sep. 5, 1978

[54] PROCESS AND APPARATUS FOR CONTINUOUSLY ANODIZING ALUMINUM

[76] Inventor: Howard A. Fromson, Rogues Ridge Rd., Weston, Conn. 06880

[21] Appl. No.: 762,085

[22] Filed: Jan. 24, 1977

Related U.S. Patent Documents

Reissue of:

[64] Patent No.: 3,865,700
Issued: Feb. 11, 1975
Appl. No.: 361,720
Filed: May 18, 1973

[51] Int. Cl.[2] ..... C25D 7/06; C25D 11/02; C25D 11/04

[52] U.S. Cl. ..... 204/28; 204/211

[58] Field of Search ..... 204/28, 211, 267, 269, 204/58

[56] References Cited

U.S. PATENT DOCUMENTS

| | | | |
|---|---|---|---|
| 1,068,410 | 7/1913 | Chubb | 204/58 |
| 2,541,275 | 2/1951 | Odier | 204/28 |
| 3,471,375 | 10/1969 | Cooke et al. | 204/211 |
| 3,920,525 | 11/1975 | Fromson | 204/28 |

FOREIGN PATENT DOCUMENTS

| | | | |
|---|---|---|---|
| 718,975 | 5/1942 | Fed. Rep. of Germany. | |
| 683,169 | 10/1939 | Fed. Rep. of Germany | 204/28 |
| 1,005,191 | 5/1957 | Fed. Rep. of Germany | 204/28 |

*Primary Examiner*—T. M. Tufariello
*Attorney, Agent, or Firm*—Burgess, Dinklage & Sprung

[57] ABSTRACT

Aluminum is continuously anodized using direct current in an anodizing cell having a cathode connected to the source of direct current which is succeeded by a cathodic contact cell having an anode connected to the same source of direct current. The anodizing direct current is introduced into the aluminum in the contact cell, the aluminum having an anodized oxide coating formed thereon in the anodizing cell before entering the contact cell.

11 Claims, 2 Drawing Figures

PROCESS AND APPARATUS FOR CONTINUOUSLY ANODIZING ALUMINUM

Matter enclosed in heavy brackets [ ] appears in the original patent but forms no part of this reissue specification; matter printed in italics indicates the additions made by reissue.

BACKGROUND

This invention relates to process and apparatus for continuously anodizing aluminum. The term aluminum is used herein to include aluminum base alloys which, like pure aluminun, can be electrolytically anodized to form oxide coatings. More particularly, this invention relates to a technique for continuously anodizing coils or lengths of aluminum, such as aluminum sheets, strips, wire, rods, shapes and the like (hereinafter collectively referred to as aluminum web), by introducing direct current in a cathodic contact cell into an aluminum web passing therethrough having an oxide coating thereon formed in an anodizing cell which precedes the contact cell. The direct current is picked up in the cathodic cell by the already anodized web and is transferred therealong countercurrent to the direction of movement of the web to the anodizing cell in which the oxide coating is formed.

Aluminum and aluminum base alloys in sheet, strip and wire form have been continuously anodized by a number of techniques for many years. Such anodized products are used for electrical and decorative purposes, in the manufacture of household appliances, automotive trim, building materials, farm equipment, furniture, sporting goods, cans, container closures, lithographic plates, transformers, and in many other market and product areas.

Two basic techniques are used to introduce current into a moving aluminum web. The first involves the use of a contact roll or bar and the secnd is an electrochemical technique utilizing a cathodic contact cell.

The contact roll or bar technique suffers from many deficiencies. For example, the aluminum web must be dry to avoid electrolysis which, if it occurs, dissolves the contact roller or bar anodically leaving pits in the surface thereof. [Anoter] *Another* problem is [arching] *arcing* between the two surfaces as they become separated which is brought about by the presence of edge burrs or slivers of aluminum on the web surface itself. Arcing causes pitting of the aluminum as well as pitting and oxidation of the contact member itself.

When using the cathodic contact cell technique, one of the limits on how much current can be introduced into the web is the fact that all of the current has to be introduced into a cross-sectional area of the moving web. This causes a surge of current into the unanodized web which is unprotected by an oxide coating. This tends to cause burning and results in the formation of unsound oxide coatings. Up to now the problem of arcing in the use of a solid contact member and the problem of burning due to a surge of current in the contact cell technique have been accepted as inherent limitations in the continuous anodizing of aluminum for the reason that all of the current for the anodizing operation has to be picked up by the moving web in one pass. The reason advanced for this is the fact that the anodic oxide coating formed in the anodizing operation is an electrical insulator.

The present invention now makes it possible to introduce anodizing current into more than one cross-section of the moving aluminum web and imparts to the moving web the means to avoid burning caused by a surge of current into the moving web as it enters the anodizing cell.

SUMMARY

In its broadest terms, the present invention provides an improvement in a process for continuously electrolytically anodizing aluminum web using direct current. The direct anodizing current is introduced into the aluminum web in a cathodic contact cell, the web having an anodized oxide coating formed thereon before entering the contact cell by the action of the direct current introduced in the contact cell. In a preferred embodiment, anodizing direct current from two or more sources is introduced into the aluminum web in a cathodic contact cell, the strip having an anodized oxide coating formed thereon before entering the contact cell through the action of the direct current introduced in the contact cell itself.

Stated differently, the process of the invention for continuously electrolytically anodizing aluminum web comprises continuously passing an aluminum web through an anodizing cell having a cathode connected to a source of direct current, continuously passing the aluminum web from the anodizing cell into a cathodic contact cell having an anode connected to the same source of direct current, and introducing anodizing direct current into the aluminum strip in the contact cell, the aluminum web having an anodized oxide coating formed thereon in the anodizing cell before entering the contact cell. Preferably, the contact cell has a second anode connected to a second source of direct current and the aluminum web is continuously passed from the contact cell into a second anodizing or other electrolytic treatment cell having a cathode connected to the second source of direct current.

DESCRIPTION OF THE DRAWING

The present invention will be more fully understood from the following description taken in conjunction with the accompanying drawing wherein.

DESCRIPTION

The present invention makes it possible to introduce anodizing current into a moving aluminum web into more than one cross-section thereof and into a moving web that already has at least one protective oxide layer formed thereon. This can be accomplished by using a cathodic contact cell, in which the aluminum web is cathodic, between two anodizing cells in which the aluminum strip is anodic, or by utilizing a multiplicity of electrolytic cells in which the aluminum web is alternatively negative or positive. When utilizing the preferred embodiment of the cathodic contact cell between two anodizing cells, the current introduced into the contact cell will travel in both directions thus effectively doubling the current carrying capacity of the moving aluminum web.

Figure 1:
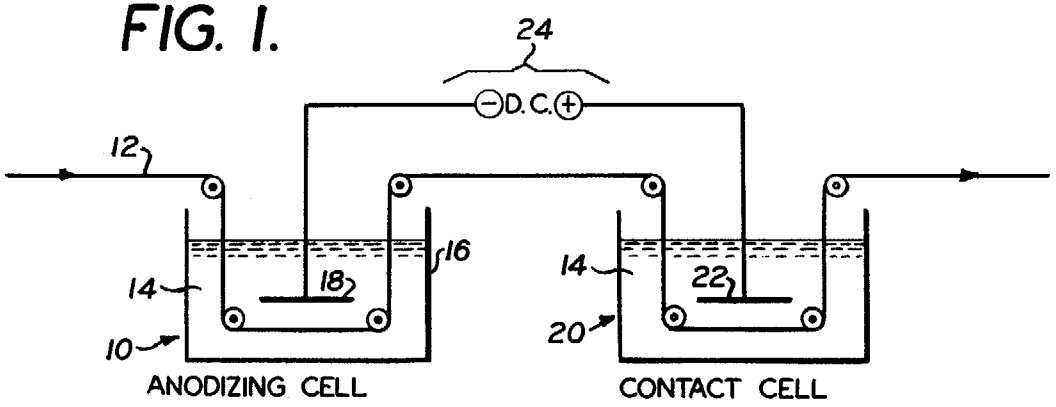
FIG. 1 is a schematic flow diagram illustrating the features of the invention in its most basic form.

Referring now to the drawing and in particular to FIG. 1, the process and apparatus for continuously

[for] electrolytically anodizing aluminum web 12 includes an anodizing cell indicated generally by reference numeral 10 followed by a contact cell indicated generally by reference numeral 20. Each cell includes a suitable tank member 16 for containing an electrolyte 14. The anodizing cell 10 has a cathode 18 therein connected to a source of direct current 24. The contact cell 20 has an anode 22 therein which is connected to the same source of direct current 24. The aluminum web 12 continually passes through the anodizing cell 10 followed by the contact cell 20 with the aid of conventional guide rollers positioned as shown in FIG. 1.

The anodizing direct [curret] *current* is introduced into the web 12 in the contact cell 20. The web 12 has an anodized oxide coating formed thereon in the anodizing cell 10 before entering the contact cell 20 by the action of the direct current introduced into the web 12 in the contact cell 20.

Figure 2:
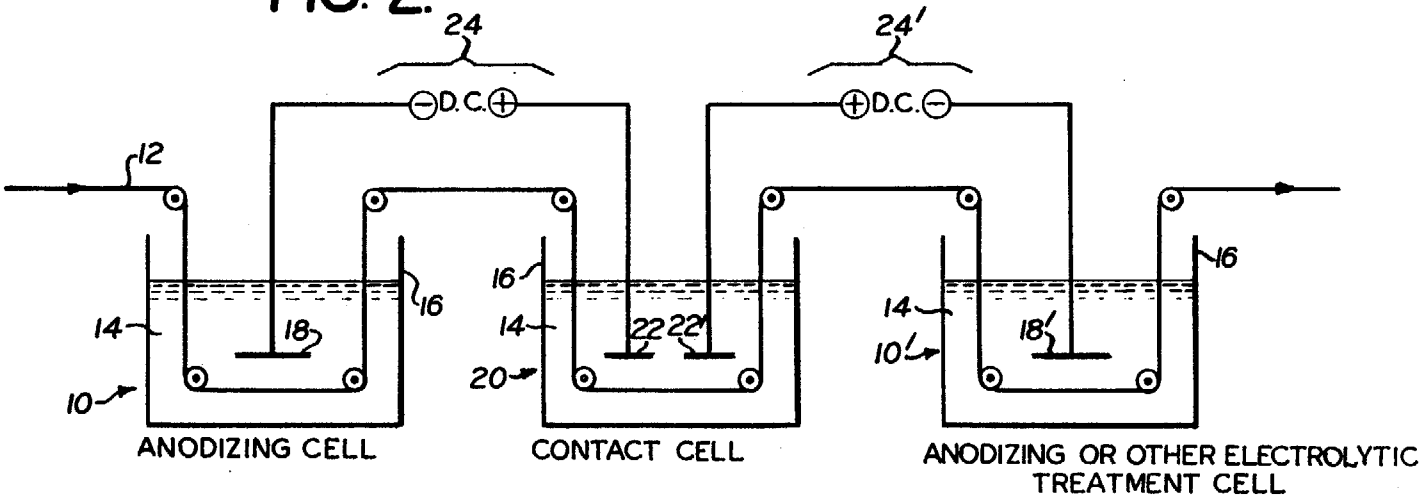
FIG. 2 is a schematic flow diagram illustrating a preferred embodiment of apparatus for carrying out the process of the invention in a preferred manner.

FIG. 2 illustrates a preferred embodiment wherein a second anodizing or other electrolytic treatment cell follows the contact cell 20. The second cell 10' contains a cathode 18' which is connected to a second source of direct current 24'. The contact cell 20 contains a second anode 22' which is connected to the same second source of direct current 24'. Thus, by utilizing the preferred embodiment illustrated in FIG. 2 with a contact cell 20 between two anodizing cells 10 and 10', the direct anodizing current introduced into the contact cell 20 from the two separate sources of direct current 24 and 24', travels in both directions thus effectively doubling the current carrying capacity of the moving aluminum web 12. Stated differently, anodizing current is introduced into the web 12 in contact cell 20 from current source 24 which flows in a direction opposite to the direction of movement of the web 12 into the preceding anodizing cell 10 wherein a portion of the desired anodized porous oxide coating is formed. The anodizing operation is completed in anodizing cell 10' by anodizing current from source 24' picked up by the strip 12 and contact cell 20 which is transmitted therealong to the anodizing cell 10'. The web 12 exits from anodizing cell 10' with the desired thickness of porous oxide coating formed thereon.

Instead of a second anodizing treatment in cell 20', which reinforces and adds to the oxide coating formed in cell 20, a further electrolytic treatment wherein the web 12 is positive can be carried out in cell 20'. For example, an electrophoresis operation can be carried out in the embodiment of FIG. 2 in cell 20 whereby resin or lacquer particles are deposited in or on the pores of the oxide coating formed in cell 20.

With respect to the embodiment shown in FIG. 1, the invention can be carried out by passing aluminum web 12 through at least two successive pairs of anodizing cell 10 followed by a contact cell 20.

As is well known in the art, the aluminum web 12 can be cleaned, de-greased or otherwise pretreated using conventional techniques before it reaches the anodizing section and after leaving the anodizing section it can be sealed, dyed or otherwise post-treated using known techniques. The web 12 is passed through the anodizing operation of the invention using conventional winding and feeding equipment.

The present invention will be more fully understood from the following examples which are not intended to limit or otherwise restrict the invention in any way. In the examples 4 × 8 inch sheets were employed. In all of the examples both sides of the aluminum sheets were anodized and the electrolyte concentration was 230 grams per liter of aqueous sulfuric acid.

EXAMPLE 1

Aluminum samples were anodized in the sulfuric acid electrolyte at constant electrolyte concentration and temperatures. DC voltage breakdown values were determined and are summarized in Table 1 below:

TABLE 1

| CURRENT (in amps) | Time ANODIC (sec.) | Time CATHODIC (sec.) | VOLTAGE BREAKDOWN (volts DC) |
|---|---|---|---|
| 25 | 60 | — | 380 |
| 25 | 60 | 60 | 380 |
| 25 | 60 | 30 | 380 |
| 25 | 30 | — | 290 |
| 25 | 30 | 30 | 290 |
| 25 | 30 | 15 | 290 |
| 20 | 20 | 20 | 220 |

The results of this Example indicate that reversing the polarity, or passing current through an oxide coating, has no detrimental or adverse effect on the anodized oxide coating. This is indicated by the DC voltage breakdown values which are identical for samples which were subjected to cathodic time and for samples which were not so subjected to cathodic time.

EXAMPLE 2

Triple sets of aluminum samples were prepared and all were anodized for the same period of time and at the same current density. Set number 1 was anodized only. Set number 2 was anodized and allowed to sit in the electrolyte while the polarity was reversed (samples Cathodic). Set number 3 was anodized and allowed to sit in the anodizing electrolyte without applying any current. For all three sets the [andizing] *anodizing* time, the time the polarity was reversed and the time the anodized samples were allowed to sit in the electrolyte was the same.

All of the samples were sealed in boiling water. The weight of the oxide coating formed were determined by first weighing the sample and then stripping off the oxide coating by soaking in a hot chromic-phosphoric acid solution and thereafter re-weighing the sample. The difference in weight divided by the total area of the sample gives the milligrams per square inch of oxide coating on the original sample. The results are summarized in Table 2.

This example illustrates that there is very little difference in the weight of the oxide coating between samples where the polarity was reversed and samples where the anodized samples were allowed to soak in the anodizing electrolyte. This indicates that the loss in oxide weight is due primarily to solvent action of the electrolyte and is not attributable to the passage of current through the coating when the polarity is reversed and the samples are cathodic. In evaluating the data of Table 2 it should be pointed out that the solvent action of the anodizing electrolyte is increased as the temperature increases which accounts for the greater loss in oxide weight at the tests run at higher temperatures.

EXAMPLE 3

Aluminum samples were anodized following three steps:

1. The sample was anodized at 40° C. at a current density of 50 a/ft$^2$ for a specific length of time.

2. With the current density remaining at 50 a/ft$^2$, the polarity was reversed making the sample cathodic while varying in temperature and time.

TABLE 2

| TIME (sec) | CURRENT DENSITY (a/ft$^2$) | ACTUAL CURRENT (amps) | VOH-AGE (volts) | "Re-VERSED" VOLTAGE (volts) | TEMP. ° C) | WEIGHT OF SET 1 (mg/in$^2$) | WEIGHT OF SET 2 (mg/in$^2$) | WEIGHT OF SET 3 (mg/in$^2$) | % WEIGHT LOSS BETWEEN SET 1 and 2 |
|---|---|---|---|---|---|---|---|---|---|
| 150 | 40 | 15.5 | 16 | 2 | 30 | 5.57 | 5.45 | 5.21 | 2 |
| 150 | 40 | 15.5 | 13 | 2 | 40 | 5.09 | 4.62 | 4.67 | 9 |
| 150 | 40 | 15.5 | 10 | 2 | 50 | 4.56 | 2.94 | 3.09 | 33 |

3. The aluminum sample was again anodized at 40° C. at a current density of 50 a/ft$^2$ for a specific length of time.

Control samples were anodized at 40° C. at a current density of 50 a/ft$^2$ for a period of time equalling the total time in steps 1 and 3. Step 2 was eliminated.

All samples in this example were sealed in hot water and the oxide coating weights were determined as described in Example 2. The data are summarized in Tables 3 and 4 below:

TABLE 3

| TIME STEP 1 (sec) | VOLT-AGE STEP 1 (volts) | TIME STEP 2 (sec) | VOLT-AGE STEP 2 (volts) | TEMP STEP 2 (° C) | TIME STEP 3 (sec) | VOLT-AGE STEP 3 (volts) | TIME STEP 1 & 2(sec) | SAMPLE COATING WEIGHT (mg/in$^2$) | CONTROL COATING WEIGHT (mg/in$^2$) | % WEIGHT LOSS OF SAMPLE |
|---|---|---|---|---|---|---|---|---|---|---|
| 54 | 13.5 | 48 | 2 | 60 | 66 | 13 | 120 | 4.488 | 4.946 | 9.26 |
| 54 | 13.0 | 48 | 2 | 50 | 66 | 13 | 120 | 4.496 | 4.804 | 6.41 |
| 54 | 13.0 | 48 | 2 | 40 | 66 | 13 | 120 | 4.867 | 5.013 | 2.90 |
| 54 | 13.0 | 48 | 2 | 40 | 66 | 13 | 120 | 4.788 | 4.875 | 1.78 |
| 108 | 13.5 | 96 | 4 | 60 | 132 | 13 | 240 | 7.229 | 9.229 | 21.67 |
| 108 | 13.5 | 96 | 2 | 50 | 132 | 13 | 240 | 8.179 | 9.329 | 12.32 |
| 108 | 13.0 | 96 | 2 | 40 | 132 | 13 | 240 | 8.558 | 2.279 | 7.77 |

TABLE 4

| TOTAL AMPERE MIN | TEMP STEP 2 (° C) | WEIGHT OF SAMPLE (mg/in$^2$) | WEIGHT OF CONTROL (mg/in$^2$) | % WEIGHT LOSS OF SAMPLE vs. CONTROL | |
|---|---|---|---|---|---|
| 100 | 60 | 4.488 | 4.946 | 9.26 | |
| 100 | 50 | 4.496 | 4.804 | 6.41 | |
| 100 | 40 | 4.788 | 4.875 | 1.78 | 2.34 |
| 100 | 40 | 4.867 | 5.013 | 2.90 | |
| 200 | 60 | 7.229 | 9.229 | 21.67 | |
| 200 | 50 | 8.179 | 9.329 | 12.32 | |
| 200 | 40 | 8.558 | 9.279 | 7.77 | |
| 320 | 60 | 8.304 | 13.942 | 40.43 | |
| 320 | 50 | 10.729 | 14.025 | 23.50 | |
| 320 | 40 | 12.817 | 13.984 | 8.34 | |

NOTE:
Ampere - min = time anodized
X current density
C.D. = 50 a/ft$^2$
Anodizing Temperature = 40° C It is known that anodic oxide requires a forming voltage of somewhere between 12 and 13 volts (cf. Finishing Of Aluminum, Wernick and Pinner). The foregoing Examples demonstrate that when the polarity is reversed and the anodized aluminum samples are made the negative or cathodic pole of the cell, the anodized samples exhibit an unusual phenomenon and at the same current density used to anodize, the voltage drops to between 1 and 2 volts. Only minor heat is generated by resistance and there is practically no weight loss as demonstrated herein. This unique property makes it possible to continue to introduce or feed current into the aluminum web at portions where the anodic oxide coating has already been formed. By using this technique, it now becomes possible to continuously DC anodize aluminum webs without the limitations imposed by the contact roll method or the standard contact cell method where all of the current is introduced in one pass through a single cross-section of the web. In addition, by utilizing the preferred embodiment illustrated in FIG. 2, the invention makes it possible to minimize the problem of burning by enabling the contact cell to feed anodizing direct current into the web 12 after the oxide coating has been formed.

Because the aluminum web entering a cathodic contact cell according to the invention already has an anodized oxide coating formed thereon before entering the cell, it is now uniquely possible to use as the anode for the contact cell, a platable metal such as copper, nickel, zinc and the like. In this manner, direct current introduced into the aluminum web in the contact cell for forming an anodized oxide coating thereon before the web [enteres] *enters* the cell, can also be used to deposit platable metals from the anode in or on the anodized oxide coating formed on the aluminum web before it enters the contact cell. The oxide coating is porous in nature and provides an excellent surface for adhesion with metals plated onto the oxide coating in the contact cell. In effect, this embodiment utilizes direct current from one source for carrying out two operations, viz, forming an oxide coating on the aluminum web before it enters the contact cell and depositing platable metals on the preformed oxide coating while the aluminum web passes through the contact cell.

Because of the plated metal surface on an aluminum web leaving a contact cell according to the invention utilizing an anode made of a platable metal, it then becomes possible to use conventional continuous electroplating techniques to thereafter deposit one or more electroplated metal layers on the aluminum web, for example even using conventional contact drums and the like.

What is claimed is:

[1. In a process for continuously electrolytically anodizing aluminum, the improvement which comprises introducing anodizing direct current into said aluminum in a cathodic contact cell having therein an anode connected to said source of direct current, said aluminum having an anodized oxide coating formed thereon before entering said cell through the action of the direct current introduced in the contact cell itself.]

2. In a process for continuously electrolytically anodizing aluminum, the improvement which comprises introducing anodizing direct current from two or more sources in a cathodic contact cell having therein anodes connected to said sources of direct current, the aluminum having an anodized oxide coating formed thereon before entering said cell through the action of the direct current introduced in the contact cell itself.

[3. Process for continuously electrolytically anodizing aluminum web which comprises continuously passing said web through an anodizing cell having therein a cathode connected to a source of direct current, continuously passing said web from said anodizing cell into a cathodic contact cell having therein an anode connected to said source of direct current, and introducing anodizing direct current into said web in said contact cell, said web having an anodized oxide coating formed thereon in said anodizing cell before entering said contact cell through the action of the direct current introduced in the contact cell itself.]

[4. Process of claim 3 wherein said contact cell has a second anode connected to a second source of direct current and said web is continuously passed from said contact cell into a second cell having a cathode therein connected to said second source of direct current.]

[5. Process of claim 4 wherein said second cell is an anodizing cell.]

[6. Process of claim 4 wherein said second cell is a further electrolytic treatment cell.]

[7. Process of claim 3 wherein said aluminum strip is passed through at least two successive pairs of said anodizing cell followed by said contact cell.]

[8. Apparatus for continuously electrolytically anodizing aluminum web which comprises anodizing cell means containing a cathode connected to a source of direct current, cathodic contact cell means containing an anode connected to said source of direct current, and means for continuously passing said aluminum web first through said anodizing cell means and then through said contact cell means, the anodizing direct current entering said web in said contact cell means with an anodized oxide coating formed thereon through the action of the direct current introduced in the contact cell itself.]

[9. Apparatus of claim 8 wherein said contact cell means contains a second anode connected to a second source of direct current and a second cell means are provided containing a cathode connected to said second source of direct current, said means for passing being adapted to continuously pass said web through said second anodizing cell means after passing through said contact cell means.]

[10. Apparatus of claim 9 wherein said second cell means is an anodizing cell means.]

*11. In a process for continuously electrolytically anodizing a moving aluminum web using the cathodic contact cell technique, the improvement which comprises introducing anodizing direct current from at least two direct current sources into said moving aluminum web into at least two cross-sections thereof, portion of the anodizing being carried out before the aluminum web enters the contact cell.*

*12. Process of claim 11 wherein the anodizing current is introduced by passing said moving aluminum web through at least two successive pairs of an anodizing cell followed by a contact cell.*

*13. Process of claim 11 wherein the anodizing current is introduced into said moving aluminum web by using a contact cell between two anodizing cells whereby anodizing current introduced from a first source of direct current into the first cross-section of said web flows in a direction opposite to the direction of movement of said web and anodizing current introduced from a second source of direct current into the second cross-section of the web flows in the direction of movement of said web.*

*14. Process for continuously forming a porous anodic oxide coating on aluminum which comprises:*

*(i) passing aluminum through a cathodic contact cell, said aluminum having a portion of the thickness of said porous anodic oxide coating already formed thereon before entering said contact cell through the action of anodizing direct current from a first source of direct current introduced into said contact cell; and*

*(ii) further anodizing the already anodized aluminum to form the remaining portion of the thickness of the porous anodic oxide coating by introducing anodizing direct current from a second source of direct current into said already anodized aluminum in said contact cell.*

*15. Process for continuously forming a porous anodic oxide coating on an aluminum web which comprises:*

*(i) passing said web through a first anodizing cell having therein a cathode connected to a first source of direct current;*

*(ii) passing said web from said first anodizing cell into a cathodic contact cell having therein an anode connected to said first source of direct current and a second anode connected to a second source of direct current;*

*(iii) passing said web from said contact cell into a second anodizing cell having a cathode therein connected to said second source of direct current; and*

*(iv) introducing anodizing direct current from said sources into said web in said contact cell thereby forming a portion of the thickness of the porous oxide coating in said first cell and the remaining portion in said second anodizing cell.*

*16. Process of claim 15 wherein said second anodizing cell is replaced by a further electrolytic treatment cell.*

*17. Process for continuously forming a porous anodic oxide coating on an aluminum web which comprises:*

*(i) passing said web through a first anodizing cell having therein a cathode connected to a first source of direct current;*

*(ii) passing said web from said first anodizing cell into a first cathodic contact cell having therein an anode connected to said first source of direct current;*

*(iii) passing said web from said first contact cell into a second anodizing cell having therein a cathode connected to a second source of direct current; and*

*(iv) passing said web from said second anodizing cell into a second cathodic contact cell having therein an anode connected to said second source of direct current.*

*18. Apparatus for continuously forming a porous anodic oxide coating on an aluminum web which comprises first anodizing cell means containing a cathode connected to a first source of direct current, cathodic contact cell means containing a first anode connected to said first source of direct current and a second anode connected to a second source of direct current, second anodizing cell means containing a cathode connected to said second source of direct current means for continuously passing said aluminum web through said first anodizing cell means, then through said contact cell means and lastly through said second anodizing cell means, the anodizing direct current from said sources entering said web in said contact cell means.*

*19. Apparatus of claim 18 wherein said second anodizing cell means is replaced by a further electrolytic treatment cell means.*

*20. Apparatus for continuously forming a porous anodic oxide coating on an aluminum web which comprises first*

*anodizing cell means containing a cathode connected to a first source of direct current, first cathodic contact cell means containing an anode connected to said first source of direct current; second anodizing cell means containing a cathode connected to a second source of direct current, second contact cell means containing an anode connected to said second source of direct current, and means for passing said web successively through said first anodizing cell means, said first contact cell means, said second anodizing cell means, and said second contact cell means.*

* * * * *